March 7, 1933.   J. E. KLINE   1,900,821
OIL FILTER AND COOLER
Filed April 10, 1930
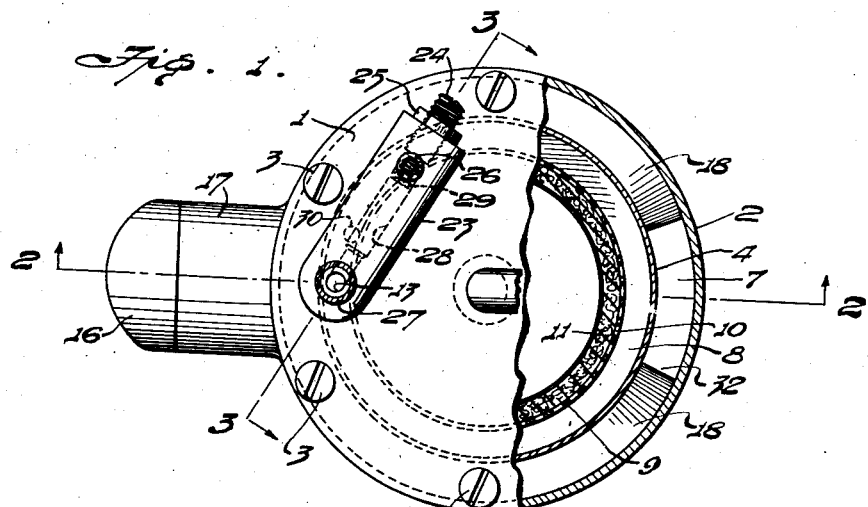
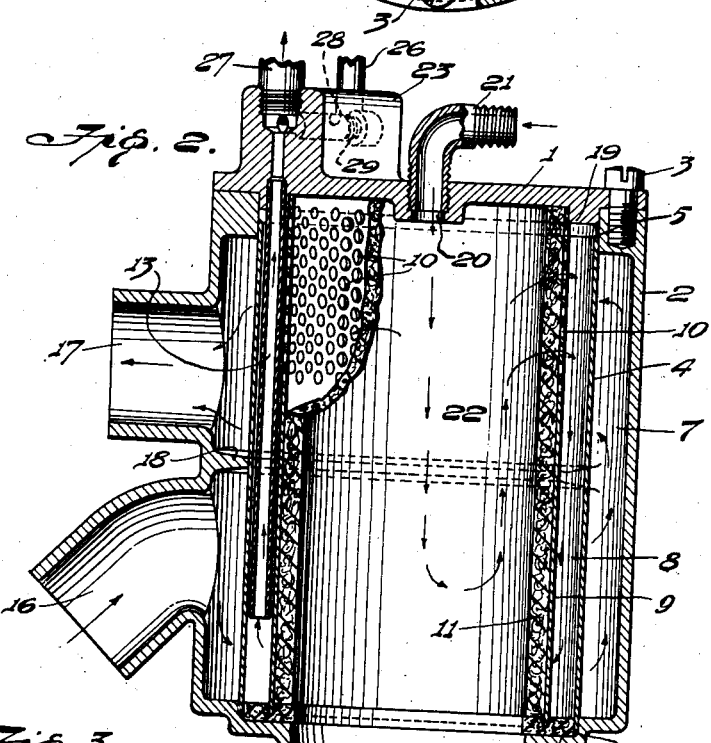
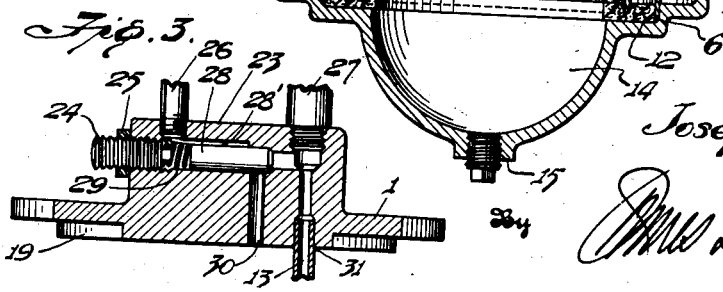
Joseph E. Kline, Inventor
Attorney Patented Mar. 7, 1933

1,900,821

UNITED STATES PATENT OFFICE

JOSEPH E. KLINE, OF ALPENA, MICHIGAN

OIL FILTER AND COOLER

Application filed April 10, 1930. Serial No. 443,149.

This invention relates to improvements in oil filters and coolers where lubricating oil is filtered and cooled after each time it has passed through the bearings which it lubricates.

A prime object of this invention is to provide a device in which the oil may be filtered and cooled in one structural unit, and wherein the oil, to insure uniformity of flow, is maintained at a high temperature until after it has been filtered.

By this invention an oil filter and cooler is provided in which dirt and sediment are prevented from being carried up into the filtering section, thus making it unnecessary to clean the apparatus except after long intervals of time, the construction being such that the apparatus may be easily taken apart for inspection and cleaning of the filtering material, means being provided for draining sediment from the filtering section between the times at which the apparatus must be taken apart for complete cleansing.

A further object of the invention is to provide an oil filter in which circulating water of low temperature and oil of low temperature will act upon a cooling surface of as large an area as possible and which will embody a water manifold not subject to corrosion, whereby a supply of cool clean oil will be supplied to the bearings to be lubricated at all speeds of the latter.

Other objects of this invention will appear from the following detailed description of a preferred embodiment of the device being disclosed in the single sheet of drawings which is herewith made a part of this application.

In the drawing,

Fig. 1 is a top plan view of an oil filter and cooler embodying the invention, a portion of the cover being broken away disclosing details of structure.

Fig. 2 is a sectional view taken along line 2—2, Fig. 1.

Fig. 3 is a sectional view taken along line 3—3.

In the oil filter and cooler shown, 1 designates a cover member made of any suitable material, and removably fastened to a water manifold or housing 2 by means of machine screws 3 or otherwise. Within and spaced from the housing 2 is a tube 4 of copper or other non-corrodible material secured at its upper and lower ends to the manifold 2, as at 5 and 6, by means of brazing or otherwise, thereby forming with the housing 2 a water manifold or chamber 7. Within the tube 4 and spaced therefrom is a tubular filter retainer 9 which itself forms a chamber 22 to receive hot oil and also forms with the tube 4 an oil reservoir or chamber 8. The filter retainer 9 is formed of any suitable material and is provided for approximately one-third the upper portion thereof with perforations 10 for the flow of oil from the hot oil chamber 22 to the oil reservoir or chamber 8. A filtering medium 11, having heat-insulating properties, such as hair or felt, disposed within the filter retainer 9, extends throughout the inner surface of the filter retainer and not only filters the oil as it passes through the perforations 10 but also serves to insulate the heated oil in the chamber 22 from the filtered and cooled oil in the oil reservoir or chamber 8. A seal 12, of felt or other suitable material, in the form of a washer or gasket, is positioned at the lower end of the housing 2 and the lower edges of the filtering medium 11 and retainer 9 bear against said seal, so that sediment cannot pass under said lower edges from the chamber 22 into the filtered oil contained in the chamber 8. A tubular member or pipe 13 depends from an oil outlet 31 in the cover 1 into the chamber 8 and terminates near the bottom of said chamber so that the oil, after it passes through the filtering material 11 and perforations 10 into the chamber 8, is caused to flow downwardly in the chamber 8 and to be exposed to the inner surface of the tube 4 and thus to be cooled before it may pass out of the chamber 8 through the tubular member or pipe 13 and outlet 31 to the bearings to be lubricated. Since the perforations 10 are in only the upper portion of the filter retainer 9, oil delivered under pressure by a pump (not shown) through a fitting 21 and an inlet 20 in the cover 1 to the filter chamber 22 will be caused to descend toward the lower portion of said chamber and must rise in said chamber above the lowermost perforations 10 before it can pass through the filtering medium 11 and perforations 10 into the chamber 8 and during such descent of the oil substances of greater specific gravity than the oil will gravitate to the lower portion of the filter chamber 9. Thus the denser substances contained in the hot oil delivered to the filter chamber 22 are prevented from clogging the filtering material 11 and the perforations 10. The filter chamber 22 has a sump 14 at its lower end to receive sediment and other denser substances which may settle from the oil while the oil is in said chamber. The sump 14 has a drain outlet 15 in its bottom.

The housing 2 has an inlet 16 and an outlet 17 for admitting and discharging cooling water to and from the chamber 7, and a baffle 18 is positioned in the chamber 7 between said inlet and outlet. Said baffle has an opening, preferably diametrically opposite the inlet and outlet, through which the cooling water which enters the chamber 7 through the inlet 16 may pass to the opposite side of said baffle and be discharged through the outlet 17.

A circular boss 19 depends from the lower side of the cover 1, which boss is of approximately the same thickness as the space between the tube 4 and filter retainer 9 and thus forms a shoulder against which the upper ends of said tube and filter retainer bear. The inlet 20 for the admission of hot oil from the bearings to the filter chamber 22 is located at approximately the center of the cover 1, and the fitting 21 mounted in said inlet serves to connect the inlet with the oil pump (not shown).

Means are provided for automatically controlling the viscosity of the oil delivered from the chamber 8 to the bearings to be lubricated. The means shown for this purpose will now be described.

A boss 23 extends upwardly from the cover 1, as best shown in Figure 3, said boss having a longitudinal bore extending from one of its ends to a point adjacent its opposite end. Said bore is of reduced diameter between its ends to form a valve seat for a piston valve 28 which is urged toward said seat by a spring 29 between said valve and a screw plug 24 in the open end of the bore. The screw plug 24 may be screwed inwardly or outwardly of said bore to adjust the tension of the spring 29 and may be secured in adjusted position by screwing a jamb nut 25 mounted thereon against the end of the boss 23.

A pair of ports 30 and 31 extend radially from the longitudinal bore through the cover 1 on opposite sides of the seat for the valve 28, the port 30 communicating with the upper end of the chamber 8 and the port 31 having the upper end of the tubular member 13 secured therein.

A second pair of ports are formed in the boss 23, one adjacent the outer end of the bore for connection by a pipe 26 to the crank case of an engine or other oil receptacle and the other diametrically opposite the port 31 for connection by piping 27 to the bearings to be lubricated.

A groove 28' extends longitudinally of the wall of the bore in which the valve 28 works from the port to which the pipe 26 is connected to a point adjacent the seat of said valve. Said groove permits the passage to the pipe 26 of any oil which may seep past the valve 28 and also serves to establish communication between the pipe 26 and the parts 30 and 31 if excess pressure of oil should occur in the said ports.

In winter the cooling medium would, if the same grade oil was used as in the summer, cool the oil down to a very heavy viscosity and the oil would not flow readily to produce the degree of lubrication desired. Also, when the viscosity of the oil increases the pressure rises very rapidly due to the fact that the oil will not run through the bearings as fast as when the oil is warm and thinner. Therefore the viscosity controller is employed to keep the filtered bearing supply oil at a set and predetermined viscosity. When the oil becomes thick from being cooled too much its pressure increases in the bearing supply line and acting against the end of the piston valve 28 unseats the valve against the tension of compression spring 29, and as the pressure becomes greater it will open the filtered hot oil port 30 and allow hot oil from the top of reservoir 8 to mix with and reduce the viscosity of the cool oil delivered through the port 31 and as the viscosity in the bearing supply line 27 is reduced the valve 28 will close until the oil attains the proper degree of viscosity as determined by the adjustment of the spring 29.

The water and oil circulation according to this invention is clearly disclosed by the arrows in the drawing. The coldest water available flows from the engine pump into the water inlet 16, thence on both sides of the water manifold 7, to the opening 32 in the baffle element 18, through which it rises, thence on both sides of the chamber 7 to the outlet 17 where it may be discharged into the engine cooling system.

In the oil circulation system, the oil enters through the fitting 21 into the oil-receiving chamber 22, and is forced toward the bottom thereof where the sediment collects in the sump 14, thence upward along the filter 11, to the perforated section 10 of the retainer 9, through the filter 11 and perforations 10 into the cooling chamber 8 and into contact with the copper partition 4, and then flows downwardly and around the lower part of the cooling chamber 8, to the lower end of the tubular member 13 fit for delivery to the bearings.

What I claim is:

1. An oil filter and cooler comprising an oil cooling chamber and a hot oil chamber inwardly of said oil cooling chamber and having at its upper portion an inlet for hot oil, filtering and insulating means in the hot oil chamber, means affording communication between the upper part of the hot oil chamber and the upper part of the cooling chamber and intercepted by said filtering means, the lower parts of the chambers being out of communication with each other, an outlet conduit for cooling oil leading upward from the lower part of the cooling chamber, and means for dissipating heat from the oil cooling chamber.

2. An oil filter and cooler comprising an oil cooling chamber, a hot oil chamber inwardly of said cooling chamber and having at its upper part an inlet for hot oil and also having a passage at its upper part only for the flow of hot oil therefrom to the cooling chamber, hot oil filtering means covering said passage and insulating said hot oil chamber from said cooling chamber, and an outlet conduit for cooled oil leading upward from the lower part of the cooling chamber.

3. An oil filter and cooler comprising a covered oil cooling chamber and a covered hot oil chamber, means for admitting hot oil under pressure into the first-named chamber, a passage between the chambers, means for filtering the oil that flows through the passage, the cover of the cooling chamber having an outlet for cooled oil and a transverse passage communicating with said outlet and having a valve seat, a valve in said passage, means urging said valve toward said seat, and a second passage through said cover from the cooling interior of the chamber to the transverse passage behind the valve seat.

4. An oil filter and cooler comprising a covered oil cooling chamber and a covered hot oil chamber, means for admitting hot oil under pressure into said hot oil chamber, a passage between the chambers, means for filtering the oil that flows through the passage, the cover of the cooling chamber having an outlet for cooled oil and a transverse conduit leading to said outlet and provided with a valve seat behind said cooled oil outlet, a valve in said conduit, means urging said valve toward said seat, and a second conduit leading from the interior of the cooling chamber to the transverse conduit behind the valve seat.

5. An oil filter and cooler comprising a closed container, a tubular partition within the container forming a central hot oil chamber, said partition having perforations adjacent its upper end, a second tubular partition between the wall of the container and said tubular partition, said second partition forming with the first-named partition an oil cooling chamber and also forming with the wall of the container a chamber for cooling fluid, a cover for said chambers having an inlet for admission of hot oil to the hot oil chamber and an outlet for cooled oil from the cooling chamber, filtering and insulating material extending over substantially the whole extent of the first-named partition for insulating the hot oil chamber from the oil cooling chamber and filtering the hot oil as it passes through said perforations, and an outlet conduit leading from the lower part of the cooling chamber to said outlet.

6. An oil filter and cooler comprising a container, a cover for said container, a tubular partition within the container and forming a central hot oil chamber, a second tubular partition outside the first partition, said second partition forming with the first partition an oil cooling chamber and forming with the wall of said container a chamber for cooling fluid, said cover having an inlet for admission of hot oil to the hot oil chamber, the inner partition having perforations in its upper portion filtering material across said perforations, an outlet conduit leading from the lower part of the cooling chamber through the cover, the wall of said container having inlet and outlet openings for the cooling fluid, a transverse conduit leading to the outlet conduit and having a valve seat, a valve in said transverse conduit, means urging said valve toward said seat, and a second conduit leading from the interior of the cooling chamber to the transverse conduit on the opposite side of said valve seat from said outlet conduit.

7. An oil filter according to claim 1 including means for maintaining oil delivered through the outlet conduit at a predetermined viscosity, said means comprising a normally closed valve subject to the pressure of the oil in the outlet conduit and adapted to be unseated when the pressure and viscosity of the oil in the outlet conduit exceeds a predetermined degree and a normally closed passageway between the upper of the oil cooling chamber and the outlet conduit, said passageway being opened by the unseating of said valve to admit to the outlet conduit oil at a higher temperature than that flowing through such conduit.

8. An oil filter according to claim 1, including means for maintaining the viscosity of oil delivered through the outlet conduit at a predetermined degree, said means comprising a port communicating with the upper part of the coil cooling chamber, and a valve normally closing communication between said port and the outlet conduit and subject to the pressure in said conduit and adapted to be opened when the pressure and viscosity of the oil in the outlet conduit exceeds a predetermined degree.

In testimony whereof I have hereunto set my hand.

JOSEPH E. KLINE.